(12) United States Patent
Dietz et al.

(10) Patent No.: US 8,972,131 B2
(45) Date of Patent: Mar. 3, 2015

(54) CONTROL SYSTEM AND METHOD FOR TRANSMISSION CLUTCH CONTROL

(75) Inventors: Steven Dietz, Novi, MI (US); Gabriel M. Gibson, Hartland, MI (US); David Szpara, Milford, MI (US); Brandon E. Hancock, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 677 days.

(21) Appl. No.: 13/157,693

(22) Filed: Jun. 10, 2011

(65) Prior Publication Data

US 2012/0316741 A1 Dec. 13, 2012

(51) Int. Cl.
*F16D 48/06* (2006.01)
*F16H 61/06* (2006.01)
*F16H 61/08* (2006.01)
*F16H 61/686* (2006.01)

(52) U.S. Cl.
CPC .............. *F16H 61/061* (2013.01); *F16H 61/08* (2013.01); *F16D 48/06* (2013.01); *F16D 2500/1024* (2013.01); *F16D 2500/3024* (2013.01); *F16D 2500/501* (2013.01); *F16D 2500/5014* (2013.01); *F16D 2500/502* (2013.01); *F16D 2500/70414* (2013.01); *F16D 2500/7109* (2013.01); *F16H 61/686* (2013.01)

USPC .......................................................... 701/66

(58) Field of Classification Search
USPC ................. 477/127, 180, 143, 121, 144, 149; 701/51, 66, 67, 58, 59, 60, 68
See application file for complete search history.

(56) References Cited

U.S. PATENT DOCUMENTS

| | | | |
|---|---|---|---|
| 2007/0135252 A1 * | 6/2007 | Wright et al. ................. | 475/116 |
| 2008/0217134 A1 * | 9/2008 | Popp et al. ................... | 192/85 R |
| 2009/0111653 A1 * | 4/2009 | Fukaya et al. ................ | 477/121 |

FOREIGN PATENT DOCUMENTS

DE            19942555 A1 *  3/2001  .............. F16H 61/06

* cited by examiner

*Primary Examiner* — Khoi Tran
*Assistant Examiner* — Adam Mott

(57) ABSTRACT

A control system for a transmission includes an actuator module, a timer module, and a pulse module. The actuator module engages N hydraulic clutches and disengages M hydraulic clutches to operate the transmission in a gear ratio, wherein N and M are integers greater than zero. The timer module determines a first period starting when the transmission begins operating in the gear ratio. The pulse module selectively supplies a pressure pulse to P of the M hydraulic clutches based on the first period, wherein P is an integer greater than zero. A method for controlling a transmission is also provided.

16 Claims, 8 Drawing Sheets

CONTROL SYSTEM AND METHOD FOR TRANSMISSION CLUTCH CONTROL

FIELD

The present disclosure relates to control systems and methods for automatic transmissions and, more particularly, to control of hydraulic clutches used to operate the transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles typically include a powerplant and transmission that transmits drive torque at various gear ratios or ranges to a drivetrain. Typically, the transmission includes a geartrain that transmits drive torque input to the transmission at the various gear ratios or ranges. Automatic transmissions include one or more hydraulically-actuated mechanisms, such as a friction clutch, that selectively couple various components of the geartrain and thereby vary the gear ratio at which the drive torque is transmitted.

Transmission control systems have been developed to control transmission operation, including the clutches used to operate the transmission in the various gear ratios. Clutch control systems may achieve a shift by disengaging one or more engaged clutches, referred to as off-going clutches, while engaging one or more disengaged clutches, referred to as on-coming clutches. The clutch control systems may engage the disengaged clutches based on expected response times. However, when actual response times lag the expected response times, the disengaged clutches may not engage as soon as desired. Delays in the expected response times may result in objectionable shift feel. For example, the delays may cause objectionable surges or sags in vehicle acceleration during down shifts and/or objectionable surges or sags in vehicle acceleration during an up shift.

SUMMARY

In one form, the present disclosure provides a control system for a transmission that includes an actuator module, a timer module, and a pulse module. The actuator module engages N hydraulic clutches and disengages M hydraulic clutches to operate the transmission in a gear ratio, wherein N and M are integers greater than zero. The timer module determines a first period starting when the transmission begins operating in the gear ratio. The pulse module selectively supplies a pressure pulse to P of the M hydraulic clutches based on the first period, wherein P is an integer greater than zero.

In various features, the pulse module supplies the pressure pulse when the first period is greater than a predetermined period. In further features, the pulse module discontinues the pressure pulse when a shift condition is met. In still further features, P is greater than one and M is greater than one.

In various other features, the pulse module supplies a first pressure pulse to a first one of the P hydraulic clutches and a second pressure pulse to a second one of the P hydraulic clutches. In a related feature, the pulse module starts the second pressure pulse a predetermined period after ending the first pressure pulse. In further features, the control system further includes a capacity module that detects when at least one of the P hydraulic clutches begins transmitting torque. In a related feature, the pulse module discontinues the pressure pulse at a time when the capacity module detects the at least one of the P hydraulic clutches is transmitting torque.

In yet other features, the control system further includes a selection module that selects the P hydraulic clutches based on the gear ratio. In still other features, the control system further includes a sequence module that determines a pulse sequence and the pulse module supplies pressure pulses to the P hydraulic clutches according to the pulse sequence. In a related feature, the sequence module determines the pulse sequence based on P second periods starting when the P hydraulic clutches are disengaged. In another related feature, the sequence module determines the pulse sequence based on engagement states of the M hydraulic clutches within a predetermined number of gear ratios of the gear ratio. In yet another related feature, the sequence module determines the pulse sequence based on a current gear.

In another form, the present disclosure provides a method for controlling a transmission. The method includes: (i) engaging N hydraulic clutches and disengaging M hydraulic clutches to operate the transmission in a gear ratio, wherein N and M are integers greater than zero, (ii) determining a first period starting when the transmission begins operating in the gear ratio, and (iii) selectively supplying a pressure pulse to P of the M hydraulic clutches based on the first period, wherein P is an integer greater than zero.

In various features, the method further includes supplying the pressure pulse when the first period is greater than a predetermined period. In further features, the method further includes discontinuing the pressure pulse when a shift condition is met. In still further features, P is greater than one and M is greater than one.

In various other features, the method further includes: (i) supplying a first pressure pulse to a first one of the P hydraulic clutches, and (ii) supplying a second pressure pulse to a second one of the P hydraulic clutches beginning a predetermined period after ending the first pressure pulse. In further features, the method further includes: (i) detecting when at least one of the P hydraulic clutches begins transmitting torque, and (ii) discontinuing the pressure pulse at a time when the one of the P hydraulic clutches begins transmitting torque. In yet other features, the method further includes selecting the P hydraulic clutches based on the gear ratio. In still other features, the method further includes: (i) determining a pulse sequence based on P second periods starting when the P hydraulic clutches are disengaged, and (ii) supplying pressure pulses to the P hydraulic clutches according to the pulse sequence. In yet other features, the method further includes: (i) determining a pulse sequence based on engagement states of the M hydraulic clutches within a predetermined number of gear ratios of the gear ratio, and (ii) supplying pressure pulses to the P hydraulic clutches according to the pulse sequence. In still further features, the method further includes: (i) determining a pulse sequence based on a current gear, and (ii) supplying pressure pulses to the P hydraulic clutches according to the pulse sequence.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
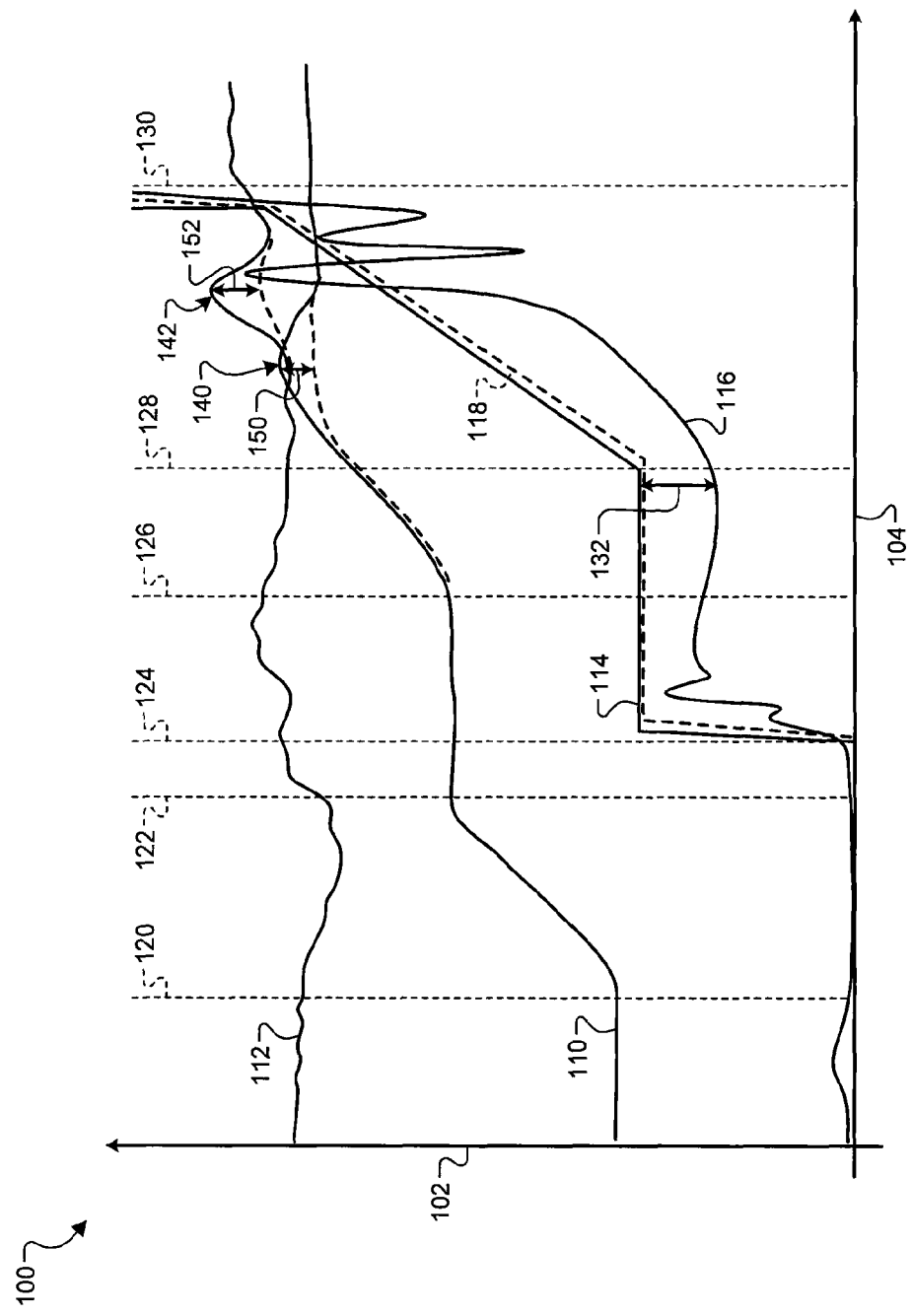
FIG. 1 is a chart of torque converter turbine speed versus time illustrating improved clutch control during a power-on down shift according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

During steady-state operation of a transmission, for example, when the vehicle is cruising on a highway at a relatively constant speed, hydraulic fluid within apply chambers of one or more disengaged clutches may drain or leak down. For example, hydraulic fluid may exit a clutch apply chamber by leaking past clutch apply components, such as a piston, a valve, a seal, or an air bleed. Clutches that include clutch apply components that rotate within the transmission may be particularly susceptible to leak down due to the effect of centrifugal forces on the clutch apply components and hydraulic fluid within the clutch apply chambers. Additionally, leak down may increase over time due to wear of the clutch apply components.

When fluid drains from an apply chamber of a disengaged clutch, the clutch may not develop torque capacity as soon as expected when engaging the clutch to execute a shift, resulting in a delay in response time. The delay in response time may cause a flare in turbine speed (i.e., turbine speed flare) that results in an objectionable surge or sag in vehicle acceleration during an down shift and/or an objectionable surge or sag in vehicle acceleration during an up shift. As used herein, steady-state operation generally refers to operation of the transmission in a gear ratio between up shifts and down shifts (i.e., when a shift is not in progress).

The present disclosure provides a clutch control system and method for a transmission that improves control of the hydraulic clutches used to operate the transmission. The control system includes a clutch control module that supplies a pressure pulse to one or more disengaged clutches during steady-state operation of the transmission. The clutch control module discontinues the pressure pulse before one or more of the disengaged clutches begins transmitting torque, for example, as a result of receiving the pressure pulse. The clutch control module also discontinues the pressure pulse prior to executing a shift.

The pressure pulse supplies a volume of hydraulic fluid to the clutch apply chambers of the disengaged clutches that helps to maintain the fluid within the clutch apply chambers at a desired level (e.g., full) while disengaged. By maintaining the fluid within the clutch apply chambers at desired levels, expected response times of the disengaged clutches during a subsequent shift can be consistently achieved. Consistency in the expected response times may inhibit turbine speed flares, undesirable shift noise, and feel associated with turbine speed flares. Consistency in the response times may also reduce clutch wear over time and improve transmission durability.

In various implementations, the clutch control module selects one or more of the disengaged clutches to receive a pressure pulse based on time or period in a current gear ratio. In related features, the clutch control module supplies more than one pressure pulse to a disengaged clutch, and avoids supplying a pressure pulse to more than one of the disengaged clutches at the same time.

With particular reference to FIG. 1, a chart 100 of torque converter turbine speed and vehicle acceleration along a vertical axis 102 versus time along a horizontal axis 104 generally illustrates improved clutch control during a power-on down shift according to the present disclosure. The chart 100 includes a plot 110 of turbine speed versus time and a plot 112 of vehicle acceleration versus time for a power-on down shift from a sixth gear to a fourth gear to a third gear. The chart 100 also includes a plot 114 of a commanded clutch pressure versus time and a plot 116 of a measured clutch pressure versus time for an on-coming clutch. The chart 100 further includes a plot 118 of an estimated clutch pressure according to the present disclosure. A down shift between the sixth gear to the fourth gear begins at a time 120 and is complete at a time 122. Pressure within an apply chamber of the on-coming clutch is increased beginning at a time 124 and a down shift between the fourth gear and the third gear begins at a time 126. The pressure to the on-coming clutch is ramped up to a full apply pressure beginning at a time 128 and the shift into the third gear is complete at a time 130.

The chart 100 illustrates a pressure difference 132 between the commanded clutch pressure and the measured clutch pressure during a period between the time 124 when pressure within the clutch apply chamber is increased and when the on-coming clutch is fully engaged in the third gear at the time 130. The pressure difference 132 is due to leak down in the pressure within the clutch apply chamber. The difference 130 delays an increase in the clutch pressure at the time 128 when the commanded clutch pressure is ramped up. The delay causes a turbine speed flare indicated at reference numeral 140, which results in an undesirable surge in vehicle acceleration indicated at reference numeral 142, which causes objectionable shift feel.

The estimated clutch pressure illustrated by the plot 118 is an estimate of the clutch pressure for the on-coming clutch that can be achieved by pulsing the on-coming clutch during a period the on-coming clutch is idle prior to the time 124 when the pressure to the clutch apply chamber is increased in anticipation of the impending down shift. The estimated clutch pressure tracks the commanded clutch pressure more closely and reduces the turbine flare 140 as indicated at reference numeral 150. The reduction 150 in the turbine flare 140 reduces the surge 142 in vehicle acceleration as indicated at reference numeral 152, thereby improving shift feel.

Figure 2:
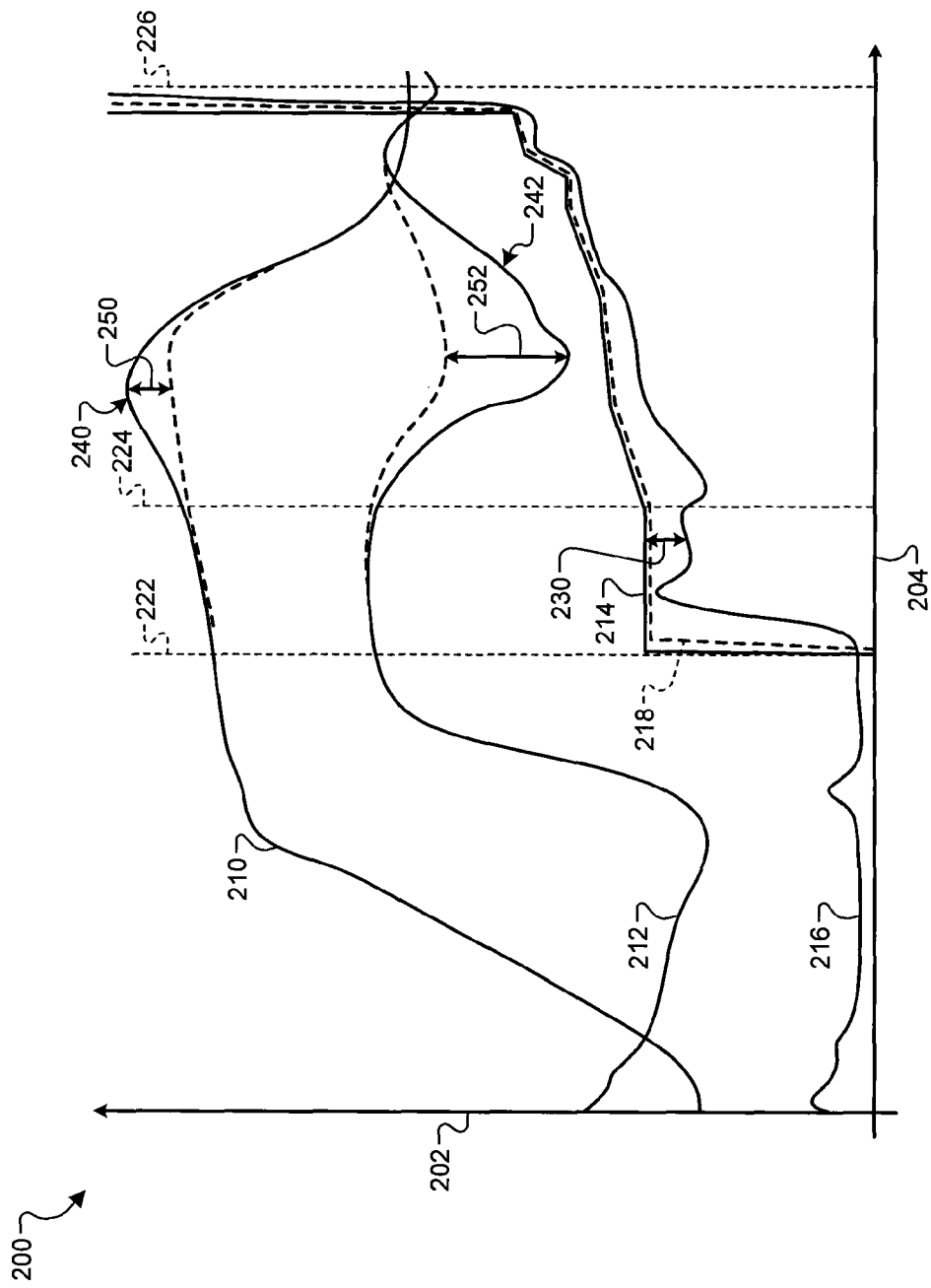
FIG. 2 is a chart of torque converter turbine speed versus time illustrating improved clutch control during an up shift according to the present disclosure.

With particular reference to FIG. 2, a chart 200 of torque converter turbine speed and vehicle acceleration along a vertical axis 202 versus time along a horizontal axis 204 generally illustrates improved clutch control during an up shift according to the present disclosure. The chart 200 includes a plot 210 of turbine speed and a plot 212 of vehicle acceleration for an up shift from a second gear to a third gear. The chart 200 further includes a plot 214 of a commanded clutch pressure and a plot 216 of a measured clutch pressure for an on-coming clutch, as well as a plot 218 of an estimated clutch pressure according to the present disclosure. An up shift between the second gear to the third gear begins at a time 222. A pressure to an apply chamber of the on-coming clutch is increased beginning at the time 222 and the pressure to the on-coming clutch is ramped up to a full apply pressure beginning at a time 224. The shift into the third gear is complete at a time 226.

The chart 200 illustrates a pressure difference 230 between the commanded clutch pressure and the measured clutch pressure during a period between the time 222 when the pressure within the clutch apply chamber is filled and when the on-coming clutch is fully engaged at the time 226. The pressure difference 230 is due to leak down in the pressure within the clutch apply chamber. The pressure difference 230 delays an increase in the clutch pressure at the time 224 when the commanded pressure is ramped up. The delay causes a turbine speed flare indicated at reference numeral 240, which results in an undesirable sag in vehicle acceleration indicated at reference numeral 242, which causes objectionable shift feel.

The estimated clutch pressure illustrated by the plot 218 is an estimate of the clutch pressure for the on-coming clutch that can be achieved by pulsing the on-coming clutch during a period the on-coming clutch is idle prior to the time 222 when the pressure to the clutch apply chamber is increased for the impending up shift. The estimated clutch pressure tracks the commanded clutch pressure more closely and reduces the turbine flare 240 as indicated at reference numeral 250. The reduction 250 in the turbine flare 240 reduces the sag 242 in vehicle acceleration as indicated at reference numeral 252, thereby improving shift feel.

Figure 3:
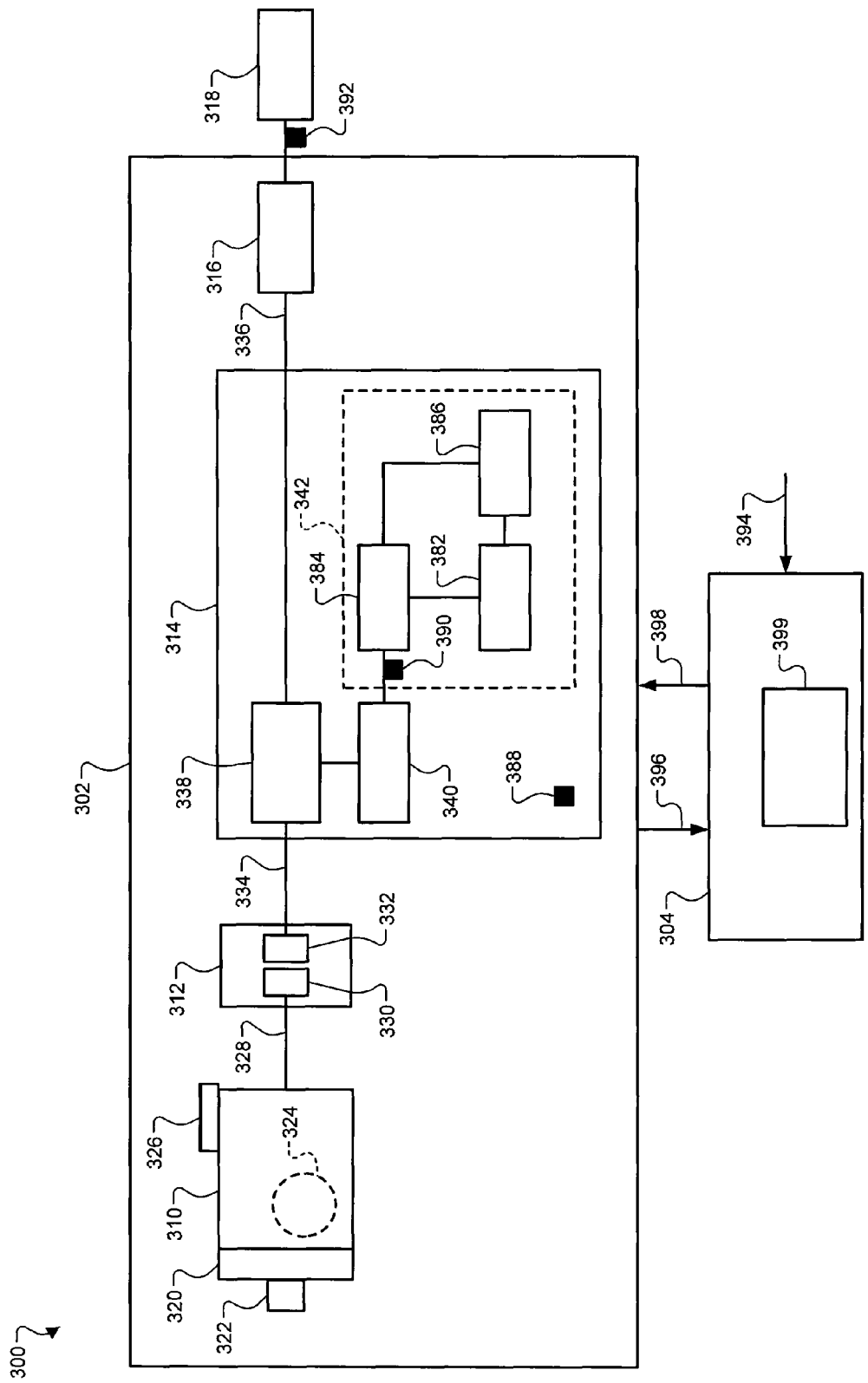
FIG. 3 is a functional block diagram illustrating an exemplary vehicle system according to the present disclosure.

With particular reference to FIG. 3, a functional block diagram illustrates an exemplary vehicle system 300 for a vehicle according to the present disclosure. The vehicle system 300 includes a powertrain 302 controlled by a control module 304. The vehicle system 300 further includes various sensors, discussed below, that measure various operating conditions used by the control module 304 to control operation. The powertrain 302 includes a powerplant including an engine 310, a torque converter (TC) 312, a transmission 314, and a driveline 316. The engine 310 produces drive torque that is transmitted through the TC 312 to the transmission 314. The transmission 314 transmits the drive torque to the driveline 316 at various gear ratios to drive one or more wheels 318. In various implementations, the powerplant is a hybrid powerplant including an electric motor (not shown) that produces drive torque used alone or in combination with the drive torque produced by the engine 310 to drive the vehicle.

The engine 310 includes an intake system 320 including a throttle 322, one or more cylinders 324, an exhaust system 326, and a crankshaft 328. Air is drawn into the cylinders 324 through the intake system 320 and mixes with fuel to create an air-and-fuel (A/F) mixture that is combusted. Combustion of the A/F mixture drives pistons (not shown), which drive rotation of the crankshaft 328 and thereby produce drive torque. The crankshaft 328 is coupled to and drives rotation of the TC 312. Exhaust produced by combustion is expelled through the exhaust system 326.

The TC 312 includes a pump 330, a turbine 332 and, optionally, a stator (not shown). The pump 330 is drivingly coupled to the crankshaft 328. The turbine 332 is fluidly coupled with the pump 330 and is coupled to and drives rotation of the transmission 314. In various implementations, the stator is disposed between the pump 330 and the turbine 332 and is used to vary the torque transmitted through the TC 312, which may be referred to as a TC torque ratio.

Figure 4:
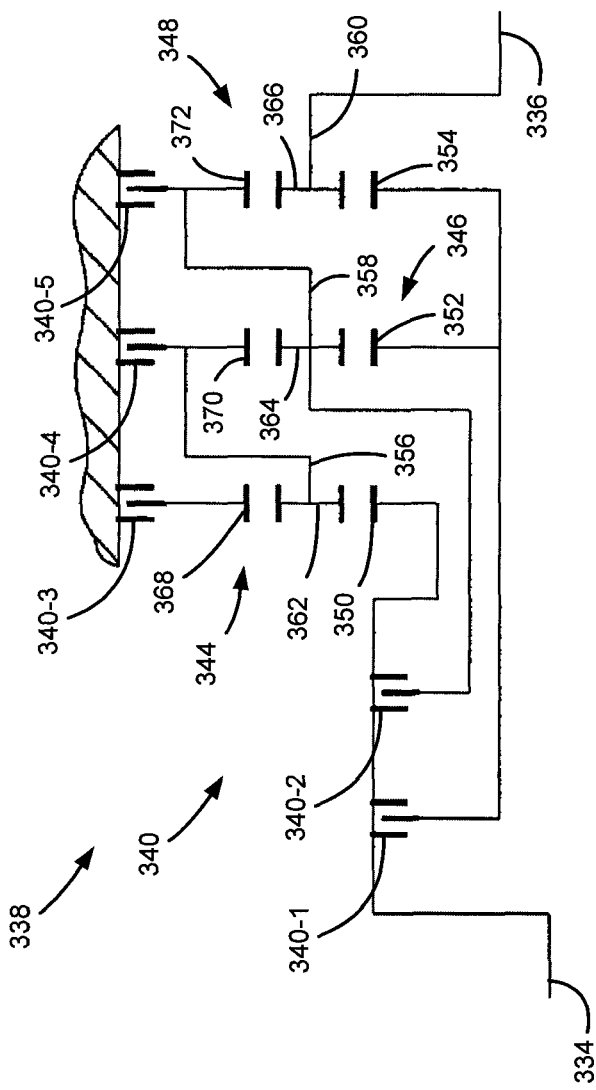
FIG. 4 is a schematic diagram illustrating an exemplary transmission according to the present disclosure.

The transmission 314 includes an input shaft 334, an output shaft 336, a gear train 338, hydraulic clutches 340, and a hydraulic actuation system 342. The input shaft 334 drivingly couples the turbine 332 with the gear train 338. The output shaft 336 drivingly couples the gear train 338 and the driveline 316. The gear train 338 transmits torque received from the TC 312 to the output shaft 336 at one or more gear ratios. With additional reference to FIG. 4, an exemplary implementation of the gear train 338 includes three inter-connected planetary gear sets 344, 346, 348. The planetary gear sets 344, 346, 348 include respective sun gears 350, 352, 354, carriers 356, 358, 360, planetary gears 362, 364, 366, and ring gears 368, 370, 372. In the present example, the clutches 340 include clutches 340-1, 340-2, 340-3, 340-4, 340-5 selectively engageable with the gear train 338 to establish a desired gear ratio of the transmission 314. For simplicity, the clutches 340-1, 340-2, 340-3, 340-4, 340-5 are referred to below and in the figures collectively as clutches 340.

The input shaft 334 continuously drives the sun gear 350 of the planetary gear set 344. The input shaft 334 selectively drives the sun gears 352, 354 of the planetary gear sets 346, 348 via the clutch 340-1 and selectively drives the carrier 358 of the planetary gear set 346 via the clutch 340-2. The ring gears 368, 370, 372 are selectively grounded via clutches 340-3, 340-4, and 340-5, respectively. The clutches 340 are selectively engaged to provide six forward gear ratios (gears 1, 2, 3, 4, 5, 6), a reverse gear ratio (R), and a neutral condition (N). The Table below summarizes the state of engagement, or what may be referred to as engagement states, for each of the clutches 340 for establishing each of the gear ratios and the neutral condition.

|   | 340-1 | 340-2 | 340-3 | 340-4 | 340-5 |
|---|-------|-------|-------|-------|-------|
| 1 | X     |       |       |       | X     |
| 2 | X     |       |       | X     |       |
| 3 | X     |       | X     |       |       |
| 4 | X     | X     |       |       |       |
| 5 |       | X     | X     |       |       |
| 6 |       | X     |       | X     |       |
| R |       |       | X     |       | X     |
| N |       |       |       |       | X     |

With reference to the above table, each of the gear ratios is established by engaging N of the clutches 340 and disengaging M of the clutches 340, where N and M are integers greater than zero. For example, the second forward gear ratio is established when clutches 340-1 and 340-4 are engaged (N=2) and clutches 340-2, 340-3, 340-5 are not engaged (M=3). Shifting between one gear ratio and another is generally achieved by disengaging one or more engaged clutches, referred to as off-going clutches, while engaging one or more disengaged clutches, referred to as on-coming clutches. As one example, the transmission is down shifted from sixth gear to fifth gear by disengaging clutch 340-4 while engaging clutch 340-3. In the example, clutch 340-4 is the off-going clutch and clutch 340-3 is the on-coming clutch.

Referring again to FIG. 3, the hydraulic actuation system 342 controls operation of the various components of the transmission 314, based on control signals received from the control module 304. According to the present disclosure, the hydraulic actuation system 342 controls the fluid pressures supplied to the clutches 340. The hydraulic actuation system 342 includes a hydraulic pressure source 382, a hydraulic circuit 384, and actuators 386. The hydraulic pressure source 382 supplies pressurized fluid to the hydraulic circuit 384 at a first pressure, which may be referred to as a line or supply pressure. The hydraulic circuit 384 supplies pressurized fluid to the clutches 340 at second pressures, which may be referred to as clutch control pressures. In an exemplary implementation, the hydraulic circuit 384 supplies pressurized fluid to the clutches 340 at pressures up to the supply pressure. The hydraulic circuit 384 includes hydraulic elements such as poppet valves, check valves, and the like, for controlling the clutch control pressures. The hydraulic circuit 384 controls the clutch control pressures by supplying fluid to or discharging fluid from apply chambers of the clutches 340. The actuators 386 actuate various components of the hydraulic pressure source 382 and the hydraulic circuit 384 in response to control signals received from the control module 304 and thereby control the supply pressure and the clutch control pressures. In an exemplary implementation, the actuators 386 include solenoids for actuating, for example, poppet valves.

According to the present non-limiting example, the vehicle system 300 further includes a turbine speed sensor 388, pressure switches 390, and a vehicle speed sensor 392. The turbine speed sensor 388 measures a rotational speed of the turbine 332 (i.e., turbine speed) and outputs a signal (not shown) indicative of the turbine speed measured. The turbine speed sensor 388 may measure the turbine speed by measuring a rotational speed of the input shaft 334. Accordingly, the turbine speed sensor 388 may be located in the transmission 314 as shown. The pressure switches 390 sense whether the apply chambers of the clutches 340 are full and output signals (not shown) indicative of whether the apply chambers are full. The pressure switches 390 may extend within passages of the hydraulic actuation system 342 that are in communication with the clutch apply chambers. Accordingly, the pressure switches 390 may be located within the hydraulic actuation system 342 as shown. The vehicle speed sensor 392 measures a speed of the vehicle. The vehicle speed sensor 392 may measure the vehicle speed by measuring a rotational speed of one or more of the wheels 318. Accordingly, the vehicle speed sensor 392 may be coupled to the wheels 318 as shown.

The control module 304 controls the operation of the powertrain 302 and, more specifically, the drive torque output by the engine 310 and the gear ratio at which the transmission 314 transmits the drive torque. The control module 304 controls the drive torque by controlling various engine operating parameters including, but not limited to, mass air flow (MAF), NE ratio, spark timing, and valve timing. The control module 304 controls the gear ratio by controlling various transmission operating parameters including, but not limited to, clutch control pressure. The control module 304 controls the operation based on various inputs, including driver inputs 394 received from various driver interface devices (not shown) and other vehicle system signals 396.

The driver interface devices may include an accelerator pedal manipulated by the driver to convey a desired drive torque and a transmission range selector or tap gear switches manipulated by the driver to convey a desired range or gear ratio of the transmission 314. The vehicle system signals 396 include signals generated by various sensors of the vehicle system 300, including the turbine speed sensor 388, the pressure sensors 390, and the vehicle speed sensor 392. In an exemplary implementation, the sensors measure various operating conditions including MAF, engine speed, and engine temperature, for example. The control module 304 controls the operation by outputting control signals based on the inputs. In various implementations, the control signals 398 include timed control signals synchronized, for example, to crankshaft position.

The control module 304 includes a transmission control module 399 that controls the operation of the transmission 314 and, more particularly, controls the clutch control pressures according to the present disclosure. The transmission control module 399 determines a desired gear ratio in which the transmission 314 is to be operated and selectively engages and disengages the clutches 340 to shift the transmission 314 between the various gear ratios. During steady-state operation of the transmission 314, the transmission control module 399 selectively pulses one or more disengaged clutches as described in more detail below.

Figure 5:
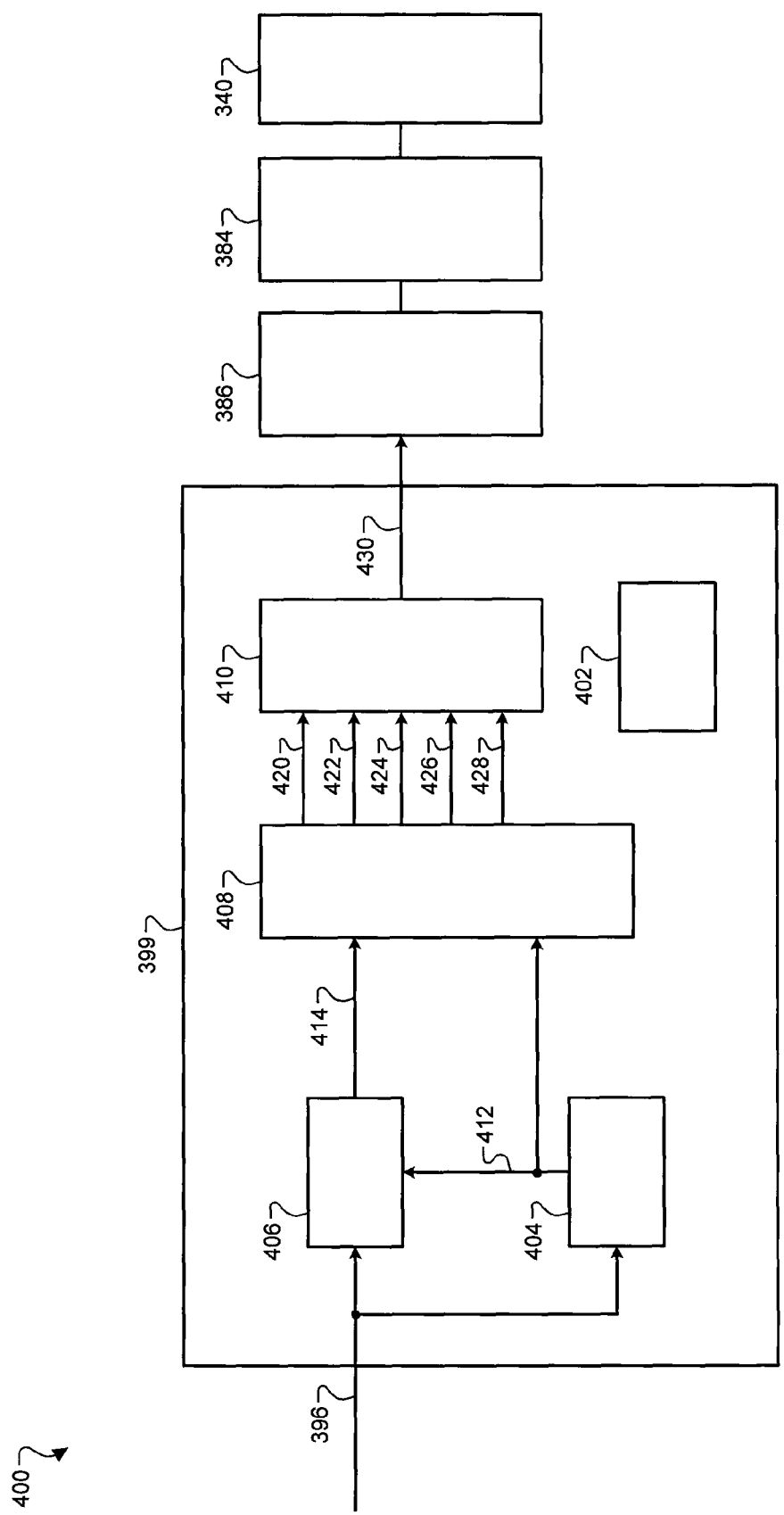
FIG. 5 is a functional block diagram illustrating an exemplary transmission control module in a transmission control system according to the present disclosure.

With particular reference to FIG. 5, a functional block diagram illustrates an exemplary implementation of the transmission control module 399 in a transmission control system 400 according to the present disclosure. The transmission control module 399 includes a memory module 402, a gear module 404, a gear selection module 406, a clutch control module 408, and an actuator module 410. The memory module 402 includes volatile and non-volatile memory where various control values used by the transmission control system 400 are stored for retrieval. Various control values may be predetermined, for example, during a calibration phase of transmission design based on transmission testing, and stored in the memory module 402.

The gear module 404 determines a current gear in which the transmission 314 is operating based on one or more of the vehicle system signals 392 and outputs the current gear ratio in a signal 412. According to the present non-limiting example, the gear module 404 outputs a current desired gear ratio as the current gear ratio. Alternately or additionally, the current gear ratio may be determined based on the rotational speeds of the input shaft 334 and the output shaft 336.

The gear selection module 406 determines a desired gear ratio in which to operate the transmission 314 and outputs the desired gear ratio in a signal 414. The gear selection module 406 may determine the desired gear ratio based on various vehicle operating parameters including, for example, accelerator pedal position, vehicle speed, engine speed, throttle position, and mass airflow rate. Accordingly, the gear selection module 406 may receive various vehicle system signals 396 and determine the desired gear ratio based on the signals received.

According to the present non-limiting example, the desired gear ratio is determined via table lookup of accelerator pedal position versus vehicle speed for the current gear ratio in a shift map. The shift map is implemented in a memory table stored in the memory module 402. The shift map includes up shift points for a given gear ratio and accelerator pedal position that correspond to vehicle speeds above which an up shift to another gear ratio is desired. The shift map further includes down shift points for a given gear ratio and accelerator pedal position that correspond to vehicle speeds below which a down shift to another gear ratio is desired. The gear selection module 406 retrieves an up shift point and a down shift point from the shift map based on the current gear ratio and the current vehicle speed. In various implementations, the gear selection module 406 adjusts the up shift point and the down shift point based on various operating conditions. In one example, the down shift point is adjusted based on a vehicle deceleration during braking. In other examples, the shift points are adjusted based on a vehicle altitude and a transmission temperature. The gear selection module 406 determines the desired gear ratio based on a comparison of the up shift point and the down shift point and the current vehicle speed. If the current vehicle speed is less than the up shift point and greater than the down shift point, then the gear selection module 406 outputs the current gear ratio as the desired gear ratio. If the current vehicle speed is greater than the up shift point, then the gear selection module 406 outputs the next higher gear ratio as a new desired gear ratio. If the current vehicle speed is less than the down shift point, then the gear selection module 406 outputs the next lower gear ratio as a new desired gear ratio.

The clutch control module 408 selectively engages and disengages the clutches 340 to operate the transmission 314 in the desired gear ratio. The clutch control module 408 controls the clutches 340-1, 340-2, 340-3, 340-4, 340-5 by outputting clutch control pressures as control values in timed signals 420, 422, 424, 426, 428, respectively, to the actuator module 410. The actuator module 410 receives the signals 420, 422, 424, 426, 428 and outputs control signals 430 to the E-M actuators 386 to achieve the clutch control pressures output by the clutch control module 408.

Figure 6:
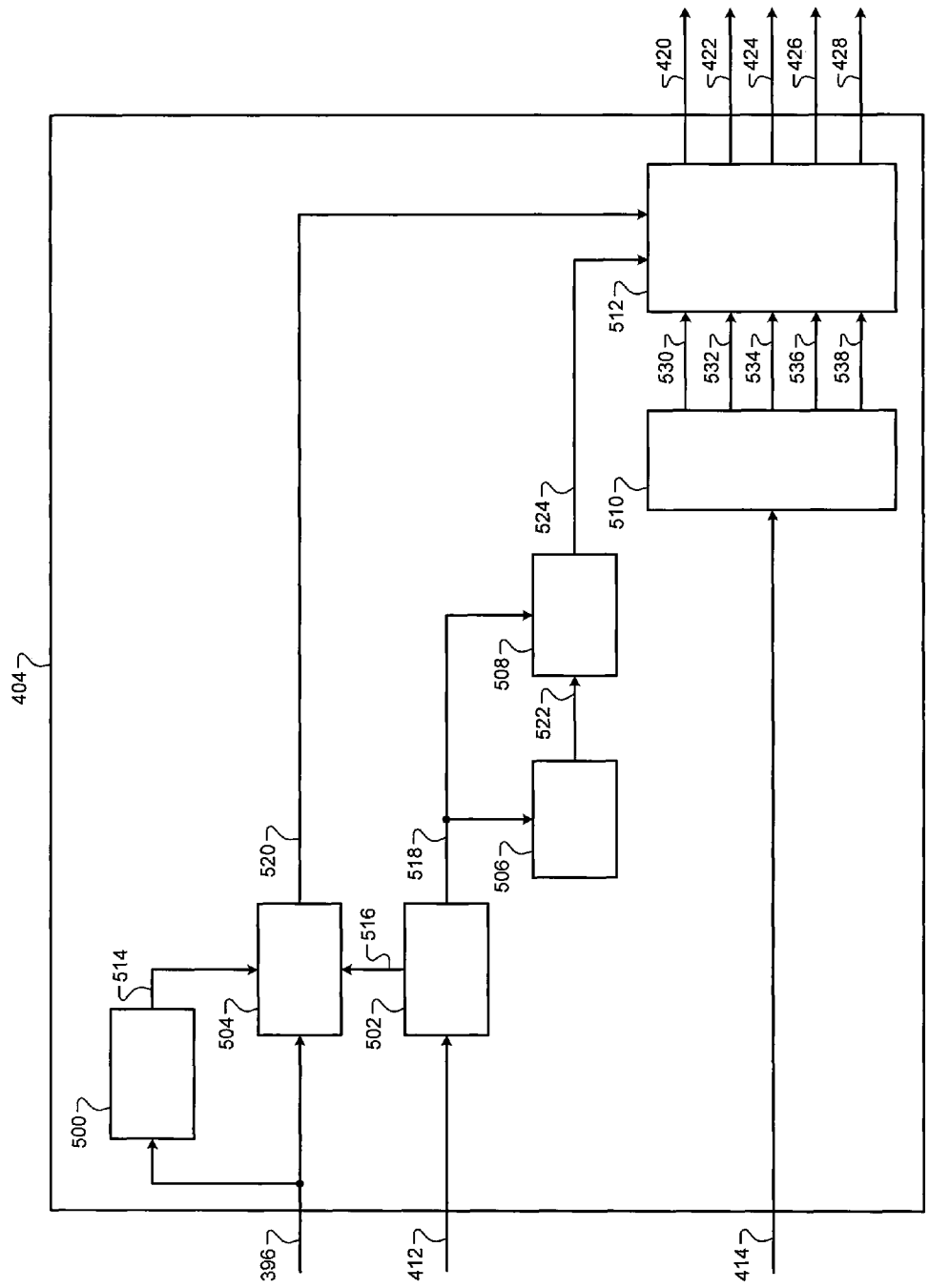
FIG. 6 is a functional block diagram illustrating an exemplary clutch control module according to the present disclosure.

With particular reference to FIG. 6, a functional block diagram illustrates an exemplary implementation of the clutch control module 408 according to the present disclosure. The clutch control module 408 includes a capacity module 500, a timer module 502, an enablement module 504, a selection module 506, a sequencing module 508, a pressure module 510, and a pulse module 512. The capacity module 500 determines when one or more of the disengaged clutches 340 begins transmitting torque. The capacity module 500 outputs a signal 514 to indicate whether one or more of the disengaged clutches 340 has begun to transmit torque.

The capacity module 500 may detect when the disengaged clutches 340 develop clutch capacity according to various methods. According to the present non-limiting example, the capacity module 500 detects when a disengaged clutch begins to transmit torque by determining when a turbine acceleration is greater than an acceleration threshold. The acceleration threshold is a predetermined acceleration stored in the memory module 402. The capacity module 500 periodically determines the turbine acceleration based on the turbine speed output by the turbine speed sensor 388. The capacity module 500 retrieves the acceleration threshold from the memory module 402 based on the current gear.

The capacity module 500 compares the turbine acceleration and the acceleration threshold. When the turbine acceleration is less than the acceleration threshold, the capacity module 500 outputs the signal 514 to indicate the disengaged clutches 340 are not transmitting torque. When the turbine acceleration is greater than or equal to the acceleration threshold, the capacity module 500 outputs the signal 514 to indicate one or more of the disengaged clutches 340 is transmitting torque. In this way, the capacity module 500 communicates when one or more of the disengaged clutches 340 has developed a capacity to transmit torque, or what may be referred to as clutch capacity.

The timer module 502 determines a period starting when the transmission 314 entered the current gear ratio that is indicative of an elapsed time in the current gear ratio, and outputs the elapsed time in a signal 516. The timer module 502 further determines periods starting when the M disengaged clutches 340 in the current gear ratio were last disengaged that are indicative of respective elapsed clutch off times, and outputs the elapsed clutch off times in a signal 518.

The enablement module 504 determines whether enablement conditions for pulsing the clutches 340 according to the present disclosure are met. The enablement module 504 further determines whether disablement criteria for discontinuing the pulsing of the clutches 340 according to the present disclosure are met. The enablement module 504 outputs a pulse enable signal 520 to enable and disable pulsing of the clutches 340. The enablement module 504 outputs the pulse enable signal 520 to enable the pulsing of the clutches 340 when the enablement criteria are met and the disablement criteria are not met. The enablement module 504 outputs the pulse enable signal 520 to disable the pulsing of the clutches 340 when the enablement criteria are not met and when the disablement criteria are met. In this way, the enablement module 504 controls a beginning and an end of pulsing the clutches 340.

According to the present non-limiting example, the enablement criteria are met when the elapsed time in the current gear ratio is greater than a predetermined period. Generally, the period will correspond to a period after which leak down may adversely affect response times of one or more of the M disengaged clutches 340. A period for each of the gear ratios may be predetermined, for example, during testing at a calibration phase of transmission design and stored in the memory module 402. The disablement criteria are met when the capacity module 500 detects that one or more of the disengaged clutches 340 is transmitting torque. The disablement criteria are also met when the gear selection module 406 determines that the current vehicle speed has crossed one of the up shift point and the down shift point.

The selection module 506 selects P of the M disengaged clutches 340 for pulsing, where P is an integer greater than zero. The selection module 506 outputs the identity of the selected P disengaged clutches 340 in a signal 522. In various implementations, the selection module 506 selects the P disengaged clutches 340 based on the current gear ratio and/or the elapsed clutch off times. In one example, the P disengaged clutches 340 are selected based on engagement states of the M disengaged clutches 340 within a predetermined number of gear ratios of the current gear ratio. More specifically, the P disengaged clutches 340 correspond to clutches 340 that are engaged to establish one or more gear ratios within a predetermined number of gear ratios of the current gear ratio. In another example, the selection module 506 selects the P disengaged clutches 340 that have an elapsed clutch off time greater than a predetermined period.

The sequencing module 508 determines a clutch pulse sequence for pulsing the selected P disengaged clutches 340 and outputs the clutch pulse sequence in a pulse sequence signal 524. The clutch pulse sequence may be determined according to various predetermined strategies. For example, the clutch pulse sequence may be in order of decreasing elapsed clutch off times. As another example, the clutch pulse sequence may avoid, or help reduce, overlapping pressure pulses to the selected P disengaged clutches 340. As yet another example, the clutch pulse sequence may be based on engagement states of the selected P disengaged clutches 340. More specifically, the clutch pulse sequence may correspond to an order in which the selected P disengaged clutches 340 are engaged during a shift sequence, for example, from the sixth gear to the fourth gear to the third gear. The pressure module 510 receives the desired gear ratio and determines clutch control pressures for the clutches 340-1, 340-2, 340-3, 340-4, 340-5. The pressure module 510 outputs the clutch control pressures as control values in signals 530, 532, 534, 536, 538, respectively.

The pulse module 512 receives the pulse enable signal 520, the clutch pulse sequence signal 524, and the clutch control pressure signals 530, 532, 534, 536, 538, and generates the signals 420, 422, 424, 426, 428 based on the signals received. The pulse module 512 outputs the clutch control pressures received from the pressure module 510 for the N engaged clutches 340 and the remaining M disengaged clutches 340 not selected by the selection module 506 in the respective signals 420, 422, 424, 426, 428. The pulse module 512 selectively adjusts the clutch control pressures received for the selected P disengaged clutches 340 based on the pulse enable signal 520 and the clutch pulse sequence output in the pulse sequence signal 524.

During periods when the pulse enable signal 520 disables clutch pulsing, the pulse module 512 outputs the clutch control pressures received from the pressure module 510 for the selected P disengaged clutches in the respective signals 420, 422, 424, 426, 428. During periods when the pulse enable signal 520 enables clutch pulsing, the pulse module 512 sequentially pulses the clutch control pressures received from the pressure module 510 for the selected P disengaged clutches 340 according to the clutch pulse sequence. The pulse module 512 outputs the adjusted clutch control pressures for the selected P disengaged clutches 340 in the respective signals 420, 422, 424, 426, 428.

Figure 7:
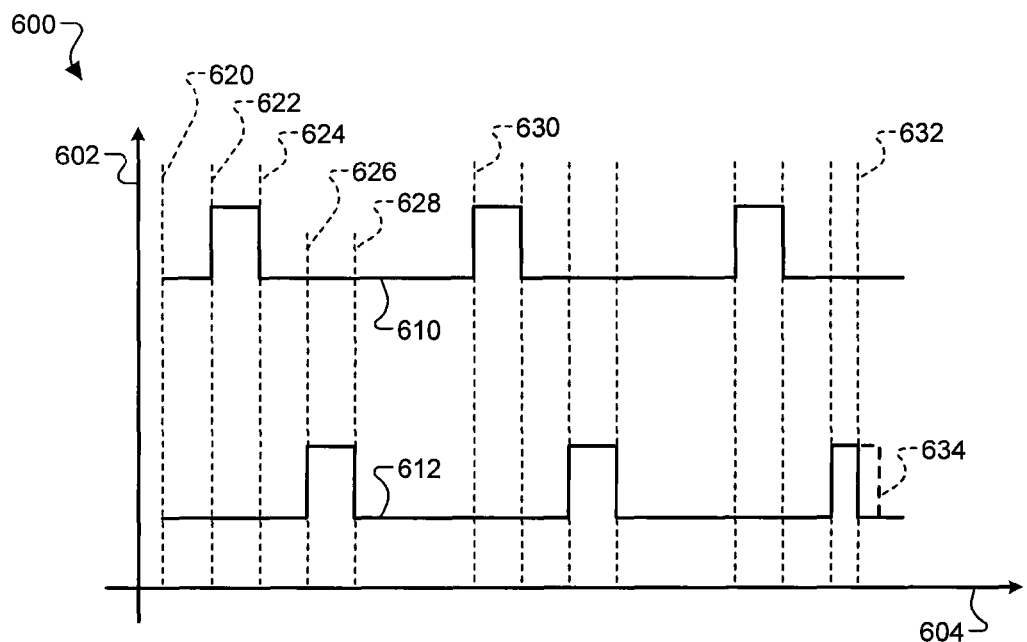
FIG. 7 is a chart of clutch control pressure versus time illustrating an exemplary clutch pulse operation according to the present disclosure.
Figure 8:
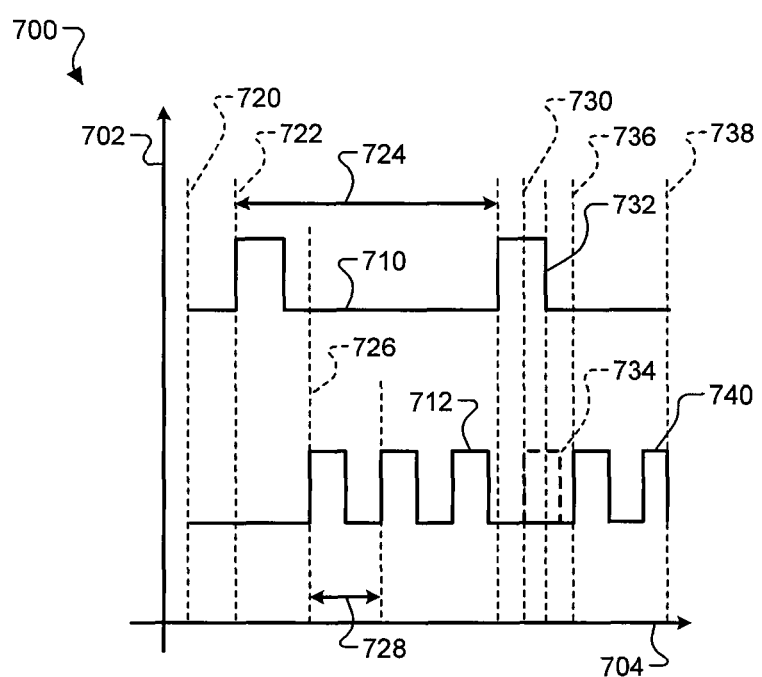
FIG. 8 is a chart of clutch control pressure versus time illustrating an exemplary clutch pulse operation according to the present disclosure.

With particular reference to FIGS. 7-8, various aspects of the operation of the pulse module 512 according to the present disclosure will be described in more detail. FIG. 7 is a chart 600 of adjusted clutch control pressure along a vertical axis 602 versus time along a horizontal axis 604 for a first clutch pulse operation including a selected two of the M disengaged clutches 340 (P=2). For exemplary purposes, FIG. 7 illustrates a clutch pulse operation in which the transmission 314 is operating in the sixth gear and the sequencing module 508 has specified that the clutch 340-3 and the clutch 340-5 are to be pulsed in that order. A plot 610 illustrates the adjusted clutch control pressure for the clutch 340-3 output in the signal 424. A plot 612 illustrates the adjusted clutch control pressure for the clutch 340-5 output in the signal 428.

Beginning at a time 620, the pulse enable signal 520 enables clutch pulsing. Beginning at a time 622, a first period after the time 620, the pulse module 512 supplies a first pressure pulse to the clutch 340-3. More specifically, the pulse module 512 increases the clutch control pressure output for the clutch 340-3 from a first pressure to a second pressure for a second period. The pulse module 512 then decreases the pressure from the second pressure to the first pressure at a time 624. Beginning at a time 626, a third period after the time 624, the pulse module 512 supplies a first pressure pulse to the clutch 340-5. More specifically, the pulse module 512 increases the clutch control pressure output for the clutch 340-5 from a first pressure to a second pressure for a fourth period. The pulse module 512 then decreases the pressure from the second pressure to the first pressure at a time 628.

Beginning at a time 630, a fifth period after the time 628, the pulse module 512 repeats the above sequence of increasing and decreasing the clutch control pressures until a time 632 when the pulse enable signal 520 disables clutch pulsing. At the time 632, the pulse module 512 decreases the pressure from the second pressure to the first pressure before the fourth period ends. A remaining period of the fourth period is illustrated by the dashed line indicated at reference numeral 634. The fourth period may be cut short because a clutch capacity in one or more of the disengaged clutches is detected and/or a shift point is crossed.

By supplying pressure pulses to the clutches 340-3, 340-5 in the foregoing manner, desired levels of the fluid in the apply chambers of the clutches 340-3, 340-5 can be maintained during periods when the clutches 340-3, 340-5 are disengaged. Pressures, durations, and frequencies of the pressure pulses may be predetermined so that the desired levels are maintained without engaging the clutches 340-3, 340-5. The pressures, durations, and frequencies may be unique to each of the clutches 340-3, 340-5.

FIG. 8 is a chart 700 of adjusted clutch control pressure along a vertical axis 702 versus time along a horizontal axis 704 for a second clutch pulse operation including a selected two of the M disengaged clutches 340 (P=2). FIG. 8 illustrates a clutch pulse operation in which the sequencing module 508 has specified that the clutch 340-3 and the clutch 340-5 are to be pulsed in that order. The second clutch pulse operation is similar to the first clutch pulse operation, except that a first frequency at which the clutch 340-3 is pulsed is different than a second frequency at which the clutch 340-5 is pulsed. The difference presents an overlap between scheduled pulses that the pulse module avoids by delaying a start of a scheduled pulse.

A plot 710 illustrates the adjusted clutch control pressure for the clutch 340-3 and a plot 712 illustrates the adjusted clutch control pressure for the clutch 340-5. Beginning at a time 720, the pulse enable signal 520 enables clutch pulsing. At a time 722, a first period after the time 720, the pulse module 512 begins pulsing the clutch 340-3 every period 724 while clutch pulsing is enabled. At the time 722, the pulse module 512 increases the clutch control pressure from a first pressure to a second pressure for a second period before decreasing the pressure from the second pressure to the first pressure.

Beginning at a time 726, a third period after the second period, the pulse module 512 begins pulsing the clutch 340-5 every period 728 while clutch pulsing is enabled. At a time 730 when a pulse 732 of the clutch 340-3 has not ended and a pulse 734 of the clutch 340-5 is scheduled to begin, the pulse module 512 delays the scheduled pulse 734 until a time 736, which occurs a period after ending the pulse 732. The pulse module 512 delays the scheduled pulse 734 to avoid an overlap in the pulses 732, 734. The pulse module 512 ends the second clutch pulse operation at a time 738 when the pulse enable signal 520 disables clutch pulsing, cutting short a pulse 740.

Figure 9:
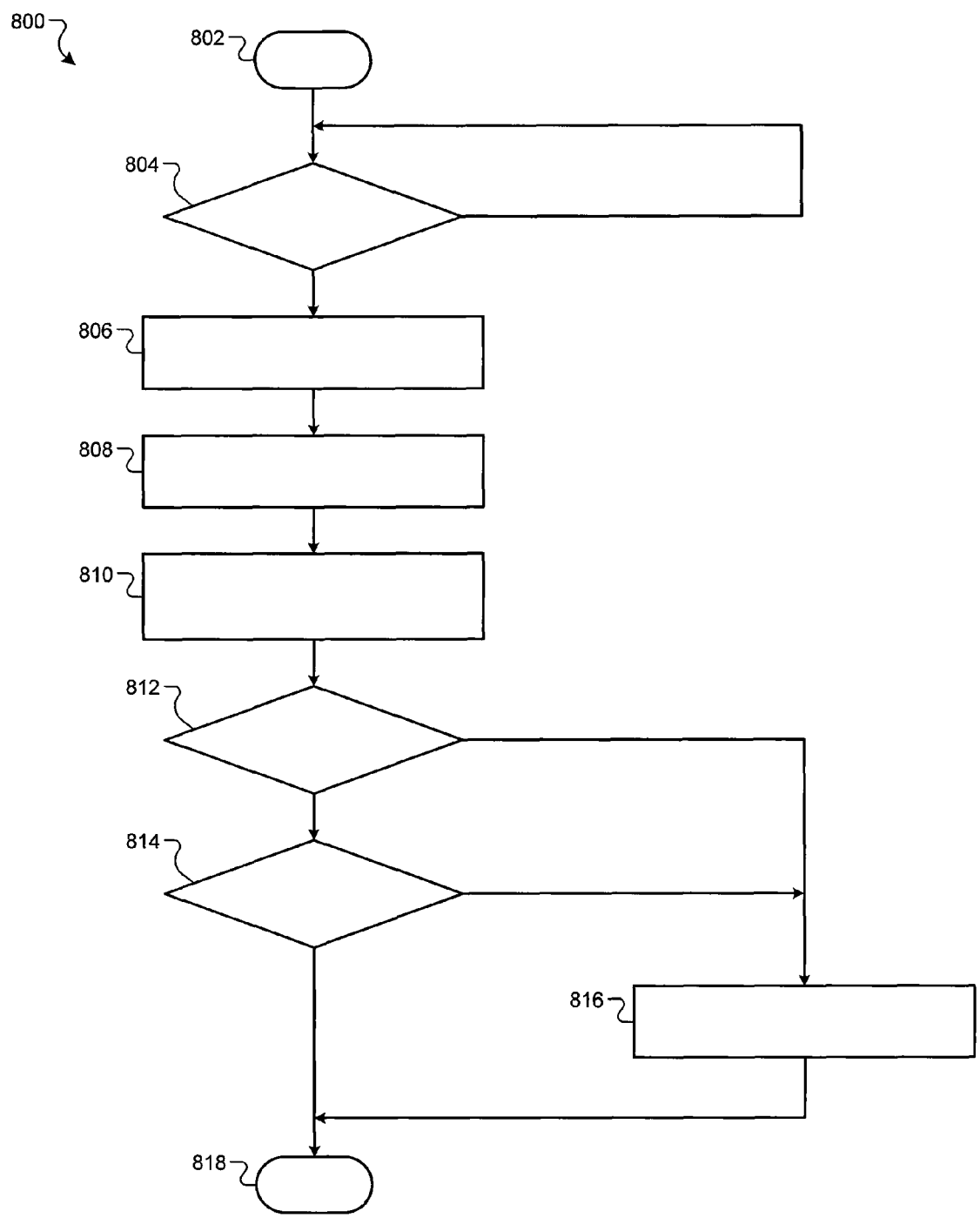
FIG. 9 is a flow diagram illustrating an exemplary method for controlling hydraulic clutches of a transmission according to the present disclosure.

With particular reference to FIG. 9, a flow diagram illustrates an exemplary method 800 for controlling hydraulic clutches of a transmission according to the present disclosure. The method 800 may be implemented in one or more modules of a transmission control system, such as the transmission control system 400 described above. Accordingly, the method 800 will be described with reference to the various control modules of the transmission control system 400. In this way, operation of the transmission control system 400 and, more particularly, the clutch control module 408 may be more fully described and understood.

A start of the method is indicated at 802. At 804, the clutch control module 408 determines whether the enablement criteria for enabling a clutch pulse operation are met. More specifically, the clutch control module 408 determines whether the elapsed time in the current gear ratio is greater than the predetermined period. If yes, then control continues at 806, otherwise, control loops back to the start at 802. At 806, the clutch control module 408 selects P of the M disengaged clutches 340 to pulse based on the current gear ratio. At 808, the clutch control module 408 determines the clutch pulse sequence for pulsing the selected P disengaged clutches 340 based on the elapsed clutch off times.

At 810, the clutch control module 408 begins a clutch pulse operation by beginning to pulse the P disengaged clutches 340 selected at 806 according to the clutch pulse sequence determined at 808. At 812, the clutch control module 408 determines whether one or more of the selected P disengaged clutches 340 is transmitting torque based on the current turbine acceleration. If the clutch control module 408 determines none of the selected P disengaged clutches 340 is transmitting torque, then the clutch pulse operation continues and control proceeds at 814, otherwise, control proceeds at 816. At 814, the gear selection module 406 determines whether the current vehicle speed has crossed either the up shift point or the down shift point. If the current vehicle speed has not crossed the up shift point or the down shift point, then the clutch pulse operation continues and control returns to the start at 802 to begin another control loop as indicated by a return to start at 818. At 816, the clutch control module 408 ends the clutch pulse operation begun at 810 and returns to the start 802 to begin another control loop as shown.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a transmission, comprising:
an actuator module that engages N hydraulic clutches and disengages M hydraulic clutches to operate said transmission in a gear ratio, wherein N is an integer greater than zero, and wherein M is an integer greater than one;
a pulse module that selectively supplies a first pressure pulse to a first one of said M hydraulic clutches and supplies a second pressure pulse to a second one of said M hydraulic clutches starting a predetermined period after ending said first pressure pulse; and
a sequence module that determines a pulse sequence based on first and second periods starting when said first and second hydraulic clutches are disengaged, respectively, wherein said pulse module selectively supplies said first and second pressure pulses to said first and second hydraulic clutches, respectively, according to said pulse sequence.

2. The control system of claim 1, further comprising a timer module that determines a third period starting when said transmission begins operating in said gear ratio, wherein said pulse module supplies said first and second pressure pulses when said third period is greater than a predetermined period.

3. The control system of claim 1, wherein said pulse module discontinues said first and second pressure pulses when a shift condition is met.

4. The control system of claim 1, further comprising a capacity module that detects when at least one of said first and second hydraulic clutches begins transmitting torque, wherein said pulse module discontinues said first and second pressure pulses at a time when said capacity module detects said at least one of said first and second hydraulic clutches is transmitting torque.

5. The control system of claim 1, further comprising a selection module that selects said first and second hydraulic clutches based on said gear ratio.

6. The control system of claim 1, wherein said sequence module determines said pulse sequence based on engagement states of said M hydraulic clutches within a predetermined number of gear ratios of said gear ratio.

7. The control system of claim 1, wherein said sequence module determines said pulse sequence based on a current gear.

8. The control system of claim 1, wherein, while said first and second hydraulic clutches are disengaged, said pulse module supplies said first pressure pulse to said first hydraulic clutch every first predetermined period and supplies said second pressure pulse to said second hydraulic clutch every second predetermined period.

9. A method for controlling a transmission, comprising:
engaging N hydraulic clutches and disengaging M hydraulic clutches to operate said transmission in a gear ratio, wherein N is an integer greater than zero, and wherein M is an integer greater than one;
selectively supplying a first pressure pulse to a first one of said M hydraulic clutches;
selectively supplying a second pressure pulse to a second one of said M hydraulic clutches beginning a predetermined period after ending said first pressure pulse;
determining a pulse sequence based on first and second periods starting when said first and second hydraulic clutches are disengaged, respectively; and
supplying said first and second pressure pulses to said first and second hydraulic clutches, respectively, according to said pulse sequence.

10. The method of claim 9, further comprising:
determining a third period starting when said transmission begins operating in said gear ratio; and
supplying said first and second pressure pulses when said third period is greater than a predetermined period.

11. The method of claim 9, further comprising discontinuing said first and second pressure pulses when a shift condition is met.

12. The method of claim 9, further comprising:
detecting when at least one of said first and second hydraulic clutches begins transmitting torque; and discontinuing said first and second pressure pulses at a time when said one of said first and second hydraulic clutches begins transmitting torque.

13. The method of claim 9, further comprising selecting said first and second hydraulic clutches based on said gear ratio.

14. The method of claim 9, further comprising
determining said pulse sequence based on engagement states of said M hydraulic clutches within a predetermined number of gear ratios of said gear ratio.

15. The method of claim 9, further comprising
determining said pulse sequence based on a current gear.

16. The method of claim 9, further comprising, while said first and second hydraulic clutches are disengaged:
supplying said first pressure pulse to said first hydraulic clutch every first predetermined period; and
supplying said second pressure pulse to said second hydraulic clutch every second predetermined period.

* * * * *